United States Patent
Swanson et al.

(10) Patent No.: US 12,471,663 B2
(45) Date of Patent: Nov. 18, 2025

(54) CORED MIDSOLE WITH DIAGONAL GEOMETRY

(71) Applicant: adidas AG, Herzogenaurach (DE)

(72) Inventors: Hayden Swanson, Portland, OR (US); Berin B, Portland, OR (US); Blayne Hettinga, Portland, OR (US); Tom Elvidge, Portland, OR (US); Griff Wilson, Portland, OR (US); Josh Gordon, Portland, OR (US)

(73) Assignee: adidas AG, Herzogenaurach (DE)

( * ) Notice: Subject to any disclaimer, the term of this patent is extended or adjusted under 35 U.S.C. 154(b) by 385 days.

(21) Appl. No.: 17/565,125

(22) Filed: Dec. 29, 2021

(65) Prior Publication Data
US 2023/0200484 A1    Jun. 29, 2023

(51) Int. Cl.
| A43B 13/12 | (2006.01) |
| A43B 13/14 | (2006.01) |
| A43B 13/18 | (2006.01) |
| A43B 13/22 | (2006.01) |

(52) U.S. Cl.
CPC ............ *A43B 13/125* (2013.01); *A43B 13/14* (2013.01); *A43B 13/181* (2013.01); *A43B 13/186* (2013.01); *A43B 13/187* (2013.01); *A43B 13/223* (2013.01)

(58) Field of Classification Search
None
See application file for complete search history.

(56) References Cited

U.S. PATENT DOCUMENTS

| 4,785,557 | A | * | 11/1988 | Kelley | A43B 13/12 36/31 |
| 5,513,449 | A | * | 5/1996 | Gramola | A43B 5/00 36/114 |
| 8,914,998 | B2 | | 12/2014 | Gheorghian et al. | |
| 9,015,862 | B2 | | 4/2015 | Wood | |
| 9,204,680 | B2 | * | 12/2015 | Hoffer | A43B 13/187 |
| 10,010,133 | B2 | | 7/2018 | Guyan | |
| 10,070,687 | B2 | | 9/2018 | Lockyer | |
| 10,674,789 | B2 | | 6/2020 | Holt | |
| 2008/0229617 | A1 | * | 9/2008 | Johnson | A43B 3/0057 36/102 |
| 2009/0313853 | A1 | * | 12/2009 | Tadin | B32B 5/24 428/314.2 |
| 2011/0167672 | A1 | * | 7/2011 | Bond | A43B 13/223 36/28 |
| 2011/0239489 | A1 | * | 10/2011 | Iuchi | A43B 13/141 36/25 R |

(Continued)

FOREIGN PATENT DOCUMENTS

| EP | 3165109 A1 | 5/2017 |
| JP | 4315435 B2 | 8/2009 |

(Continued)

*Primary Examiner* — Jameson D Collier
(74) *Attorney, Agent, or Firm* — Sterne, Kessler, Goldstein & Fox P.L.L.C.

(57) ABSTRACT

A sole for an article of footwear includes a cored midsole defining a top surface, a bottom surface, and a perimeter surface extending from the top surface to the bottom surface. The cored midsole defines apertures extending diagonally from the top surface of the cored midsole to the bottom surface of the cored midsole.

20 Claims, 19 Drawing Sheets

(56) References Cited

U.S. PATENT DOCUMENTS

| | | | | |
|---|---|---|---|---|
| 2015/0128448 A1* | 5/2015 | Lockyer | ............... | A43B 13/186 |
| | | | | 36/28 |
| 2015/0230548 A1* | 8/2015 | Cross | ..................... | A43B 5/10 |
| | | | | 36/104 |
| 2015/0245683 A1* | 9/2015 | Cross | .................... | B32B 27/065 |
| | | | | 36/103 |
| 2016/0007681 A1* | 1/2016 | Langvin | ............... | A43B 13/141 |
| | | | | 36/103 |
| 2016/0345664 A1* | 12/2016 | Kohatsu | ............... | A43B 13/186 |
| 2016/0345665 A1* | 12/2016 | Kohatsu | .................... | A43D 1/02 |
| 2016/0345667 A1* | 12/2016 | Kohatsu | .................... | A43D 1/02 |
| 2017/0202304 A1* | 7/2017 | Ng | ....................... | A43B 13/184 |
| 2017/0224052 A1* | 8/2017 | Lawless | ................ | A43B 13/04 |
| 2017/0245588 A1* | 8/2017 | Cook | ..................... | A43B 13/186 |
| 2017/0325544 A1 | 11/2017 | Ngene | | |
| 2018/0271211 A1* | 9/2018 | Perrault | ............... | A43B 13/186 |
| 2018/0271213 A1* | 9/2018 | Perrault | ............... | A43B 13/141 |
| 2018/0338571 A1* | 11/2018 | Cross | .................... | A43B 13/141 |
| 2018/0338572 A1* | 11/2018 | Cross | .................... | A43B 13/04 |
| 2019/0150556 A1 | 5/2019 | Langvin | | |
| 2020/0329813 A1* | 10/2020 | Daniel | ............... | B29D 35/0009 |
| 2021/0100320 A1* | 4/2021 | Ho | .......................... | A43D 8/18 |
| 2021/0227929 A1 | 7/2021 | Ni et al. | | |

FOREIGN PATENT DOCUMENTS

| | | |
|---|---|---|
| KR | 10-0963098 B1 | 6/2011 |
| KR | 10-2020-0068118 A | 6/2020 |
| WO | WO-2021035363 A1 * 3/2021 ............. A43B 13/04 |

\* cited by examiner

CORED MIDSOLE WITH DIAGONAL GEOMETRY

BACKGROUND

Field

Embodiments described herein relate generally to soles and articles of footwear; and more specifically, to soles and articles of footwear with a cored midsole.

Background

Articles of footwear are used to enhance the wearer's walking and/or running experience. For example, a midsole may provide cushioning, support, and stability. A midsole may also improve various aspects of the gait cycle. Improvements to soles and articles of footwear that contribute to these and other characteristics are desirable.

BRIEF SUMMARY

Soles and articles of footwear with a cored midsole are disclosed. In some embodiments, a sole for an article of footwear includes a cored midsole defining a top surface, a bottom surface, and a perimeter surface extending from the top surface to the bottom surface. In some embodiments, the cored midsole defines apertures extending diagonally from the top surface of the cored midsole to the bottom surface of the cored midsole.

In some embodiments, the apertures defined by the cored midsole extend at an angle between 55 degrees and 70 degrees relative to the bottom surface of the cored midsole.

In some embodiments, the sole includes a forefoot region, a midfoot region, and a rearfoot region. In some embodiments, the apertures are disposed in the forefoot region, the midfoot region, and the rearfoot region. In some embodiments, an average size of the apertures in the forefoot region is different than an average size of the apertures in the rearfoot region.

In some embodiments, a height of the cored midsole increases from a forefoot region to a midfoot region and decreases from the midfoot region to a rearfoot region.

In some embodiments, the sole includes a non-stretch fabric disposed at the bottom surface of the cored midsole.

In some embodiments, the sole includes a groove disposed in the bottom surface of the cored midsole. In some embodiments, the groove extends from the perimeter surface of the cored midsole to one of the apertures.

In some embodiments, the perimeter surface of the cored midsole includes protrusions extending diagonally from the top surface of the cored midsole to the bottom surface of the cored midsole.

In some embodiments, the protrusions are disposed in a rearfoot region and a midfoot region of the sole. In some embodiments, there are no protrusions in a forefoot region of the sole. In some embodiments, the protrusions maintain a consistent wall thickness between the perimeter surface and an adjacent aperture.

In some embodiments, an article of footwear includes an upper and a cored midsole coupled to the upper. In some embodiments, the cored midsole includes a plurality of walls defining diagonal apertures extending from a top surface to a bottom surface of the cored midsole. In some embodiments, a surface area of the walls at the bottom surface of the cored midsole is less than a combined area of the apertures at the bottom surface of the cored midsole.

In some embodiments, the apertures defined by the plurality of walls of the cored midsole extend diagonally towards a rearfoot region as they extend from the top surface to the bottom surface of the cored midsole.

In some embodiments, the apertures defined by the plurality of walls of the cored midsole are disposed in an alternating pattern such that a center of one of the apertures is not aligned in a transverse direction with a center of an adjacent aperture.

In some embodiments, the article of footwear includes an outsole coupled to the bottom surface of the cored midsole.

In some embodiments, the outsole of the article of footwear includes multiple pieces.

In some embodiments, the outsole of the article of footwear does not cover the apertures.

In some embodiments, an average size of the apertures disposed in a forefoot region of the cored midsole is different than an average size of the apertures disposed in a rearfoot region of the cored midsole.

In some embodiments, the article of footwear includes a reinforcing member coupled to a bottom surface of the midsole and disposed in a forefoot region of the cored midsole.

In some embodiments, the reinforcing member of the article of footwear includes a non-stretch fabric.

In some embodiments, the plurality of walls of the cored midsole includes a perimeter wall.

In some embodiments, the cored midsole includes a groove disposed in the perimeter wall at a bottom surface of the midsole. In some embodiments, the groove extends from a perimeter surface of the cored midsole to one of the apertures.

In some embodiments, the walls include a perimeter wall. In some embodiments, the perimeter wall includes protrusions extending diagonally from the top surface of the cored midsole to the bottom surface of the cored midsole. In some embodiments, the protrusions are disposed in a rearfoot region and a midfoot region of the cored midsole. In some embodiments, there are no protrusions in a forefoot region of the cored midsole.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
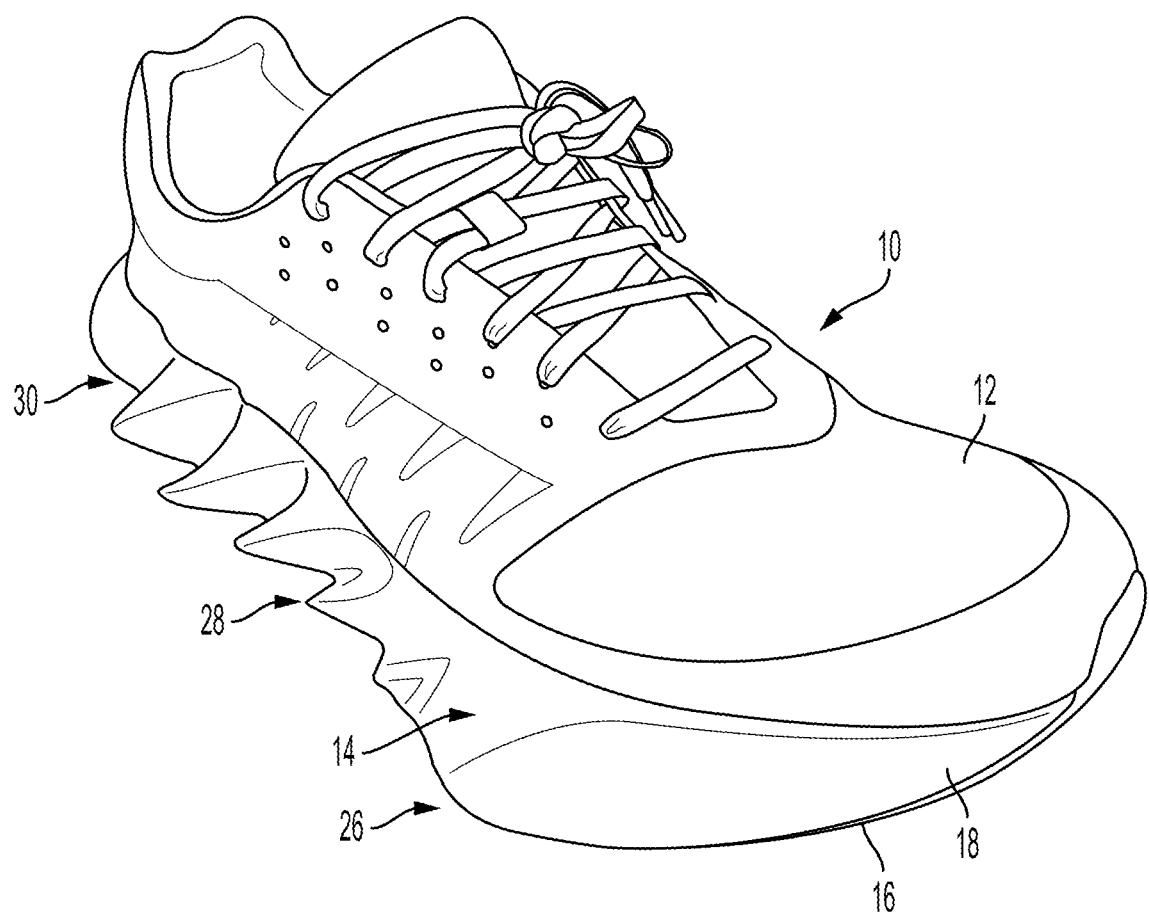
FIG. 1 shows a perspective view of an article of footwear according to some embodiments.

Reference will now be made in detail to representative embodiments, including those illustrated in the accompanying drawings. References to some embodiments indicate that the embodiments described may include a particular feature, structure, or characteristic, but every embodiment may not necessarily include the particular feature, structure, or characteristic. Further, when a particular feature, structure, or characteristic is described in connection with some embodiments, it is submitted that it is within the knowledge of one skilled in the art to include such feature, structure, or characteristic in connection with other embodiments whether or not explicitly described.

The following examples are illustrative, but not limiting. Other suitable modifications and adaptations of the variety of conditions and parameters normally encountered in the field, and which would be apparent to those skilled in the art, are within the spirit and scope of the disclosure.

Articles of footwear are used to enhance the wearer's walking and/or running experience. For example, a midsole may provide cushioning, support, and stability. A midsole may also improve various aspects of the gait cycle. Adding more structure and support to the midsole may increase the weight of the article of footwear. To counter this increased weight, a cored midsole that defines apertures therethrough reduces the weight of the footwear but may also reduce the stability. The geometry of a cored midsole may be configured to provide the desired support and stability without increasing the weight. A cored midsole that provides adequate cushioning, support, and stability is described below.

The disclosed embodiments provide articles of footwear having a cored midsole with diagonal geometry. The diagonal geometry contributes to an optimal level of cushioning and maximized comfort by regulating the ability of the midsole to collapse during physical activity. The midsole may also be configured in a way that facilitates rocking (e.g., from back to front, side to side, or both). For example, the forefoot and rearfoot regions may be curved at a bottom of the sole and/or the sole may have a height that is greatest at a midfoot region and decreases towards the forefoot and rearfoot regions. Thus, the article of footwear may promote a quicker transition to the forefoot and thereby enhance the propulsive phase of a wearer's movement.

In some embodiments, the cored midsole defines apertures disposed within the midsole. For example, the cored midsole may include apertures from a rearfoot region to a forefoot region. The apertures may extend the height of the midsole (from a bottom surface of the midsole to a top surface of the midsole). Increasing the combined area of the apertures at the bottom surface (e.g., by adding more apertures or making the apertures bigger) reduces the overall surface engaging area of the bottom surface of the midsole. The ratio between the surface engaging area and the aperture size affects the stiffness, flexion, and weight of the footwear. This ratio may vary across the sole so that it is different in various areas of the sole to provide specific stiffness and flexion for each area.

In some embodiments, an article of footwear 10, as shown, for example, in FIG. 1, comprises an upper 12 and a sole 14. Any suitable upper may be used as upper 12. In some embodiments, the upper may be made of woven single-layer or multi-layer portions, or other suitable materials. In some embodiments, the upper 12 may be a knit material. The upper may include a tongue and laces or it may be tongueless. Other fastening systems besides shoelaces may be used. Although these examples are given, any other upper may also be used.

The sole 14 may comprise an outsole 16 and a midsole 18. In some embodiments, upper 12 is coupled to midsole 18. For example, upper 12 may be stitched, bonded, or adhered to midsole 18. In some embodiments, midsole 18 is coupled to outsole 16. For example, midsole 18 may be directly bonded to outsole 16.

Midsole 18 provides support and cushioning to the article of footwear 10. In some embodiments, midsole 18 is made of a foam material. For example, midsole 18 may be made of an expanded thermoplastic polyurethane particle foam (e-TPU). In some embodiments, an ethylene-vinyl acetate (EVA) foam is used for midsole 18. Other foams or non-foam materials may also be used for midsole 18. In some embodiments, midsole 18 may be made of a combination of different materials (e.g., e-TPU particle foam and EVA foam).

Figure 2:
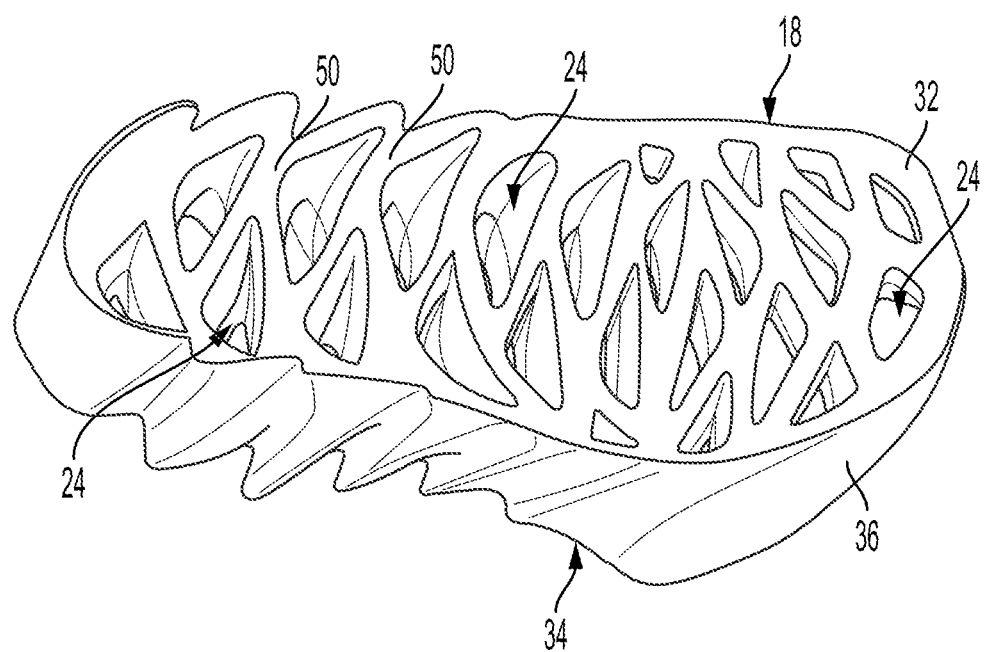
FIG. 2 shows a top perspective view of a sole for an article of footwear according to some embodiments.

As shown in FIG. 2, midsole 18 defines a top surface 32, a bottom surface 34, and a perimeter surface 36. In some embodiments, the top surface 32 of midsole 18 is coupled to upper 12 and the bottom surface 34 is coupled to outsole 16. In some embodiments, for example, as shown in the heel portion of the midsole 18 shown in FIG. 2, the perimeter surface 36 may be raised higher than the interior portion of top surface 32. In some embodiments, this configuration allows the midsole 18 to receive upper 12 into a concave top surface 32 such that the top of perimeter surface 36 may overlap upper 12.

Figure 3:
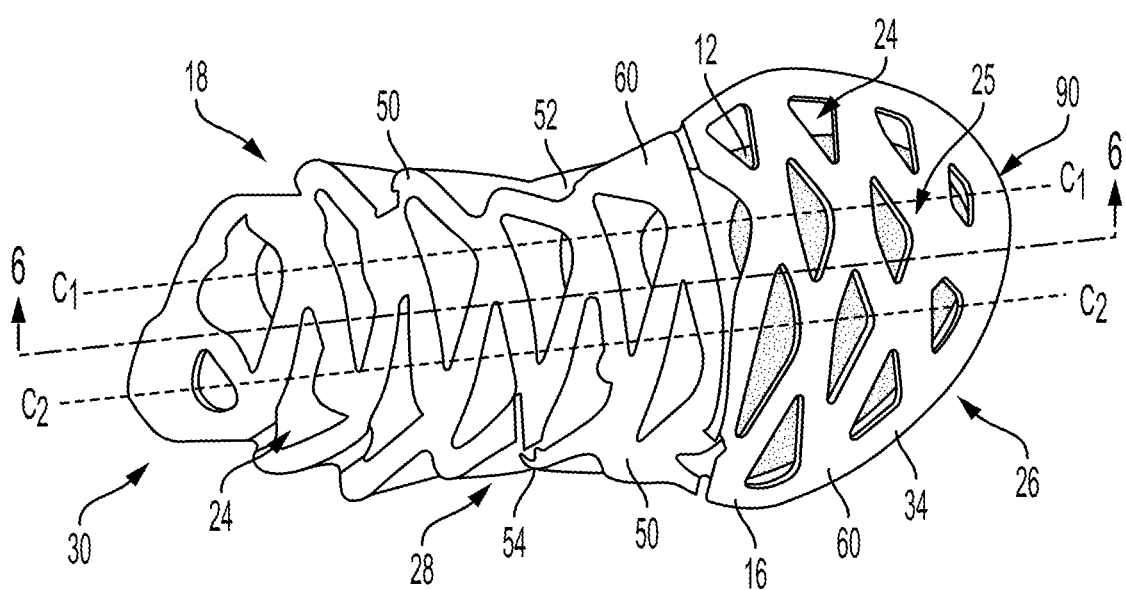
FIG. 3 shows a bottom view of a sole for an article of footwear according to some embodiments.

Midsole 18 may be a cored midsole 18 that defines a plurality of apertures 24. In some embodiments, the cored midsole 18 includes apertures 24 disposed throughout midsole 18. For example, the cored midsole 18 may include more than 10, more than 20, or more than 30 apertures. In some embodiments, the cored midsole may include about 15-30 apertures. In some embodiments, the cored midsole 18 may include 24 apertures. The apertures extend from the top surface 32 to the bottom surface 34. As shown in FIG. 3, the upper 12 (or some other component disposed above midsole 18, such as a reinforcing member 19 discussed below) may be visible through the apertures 24. In some embodiments, the apertures extend diagonally along the full height of the midsole 18. In some embodiments, apertures 24 extend diagonally towards a rearfoot region as they extend from the top surface 32 to the bottom surface 34 of the cored midsole 18. In some embodiments, apertures 24 are disposed at an angle θ, ranging from 55-70 degrees, relative to the bottom surface 34 of the midsole (see FIGS. 5-6). Such an angle facilitates collapse of the cored midsole during impact and provides a user with increased cushioning and comfort during exercise.

In some embodiments, as shown for example in FIG. 2, the midsole 18 comprises a plurality of walls 50 that define diagonal apertures 24 extending from a top surface 32 to a bottom surface 34 of the cored midsole 18. A thickness of walls 50 may be used that provides the desired stiffness, flexion, and weight of the midsole. In some embodiments, the walls 50 are between 5 mm to 10 mm thick. Other thicknesses may also be used. In some embodiments, walls 50 may have different thicknesses in different regions of the midsole 18. In addition, walls 50 may have different thicknesses at different locations along a vertical direction of the midsole 18. In some embodiments, the walls 50 may span the height of midsole 18. Walls 50 may be configured in various formations. In some embodiments, walls may be configured in a zig-zag formation such that triangular apertures 24 are defined between intersecting walls 50. In some embodiments, walls 50 may be configured in an arcuate formation such that circular apertures are defined between intersecting walls 50. In some embodiments, walls 50 may be configured in a grid formation such that square or polygonal apertures are defined between intersecting walls 50. Walls 50 may include a perimeter wall 50 that creates the closed geometric shape of the midsole 18 and forms perimeter surface 36. In some embodiments, perimeter wall 50 may extend past and overlap the upper 12.

The bottom surface of the walls 50 forms a surface engaging area 60 of midsole 18. In some embodiments, the surface engaging area 60 has a smaller surface area than the combined area of the plurality of apertures 24 at the bottom surface 34 of the midsole 18. Thus, midsole 18 may be a highly cored midsole. This configuration reduces the overall weight of the midsole 18. While a smaller ratio between surface engaging area and aperture area (i.e., surface engaging ratio) would typically result in a weaker structure, i.e. weaker or more flexible footwear, the configuration of the walls 50 and the shape and diagonal geometry of the apertures 24 compensate for the reduced surface engaging area 60 and therefore results in a lightweight shoe with sufficient stiffness. Further, the apertures 24 allow for increased vertical compression during activity while maintaining sufficient stiffness and reduced weight. Moreover, during compression, the apertures 24 (and the walls 50) provide a horizontal displacement (e.g., the top surface 32 moves forward horizontally relative to the bottom surface 34). Thus, the aperture size and corresponding angle may provide a controlled collapse and aid in forward movement.

Figure 4:
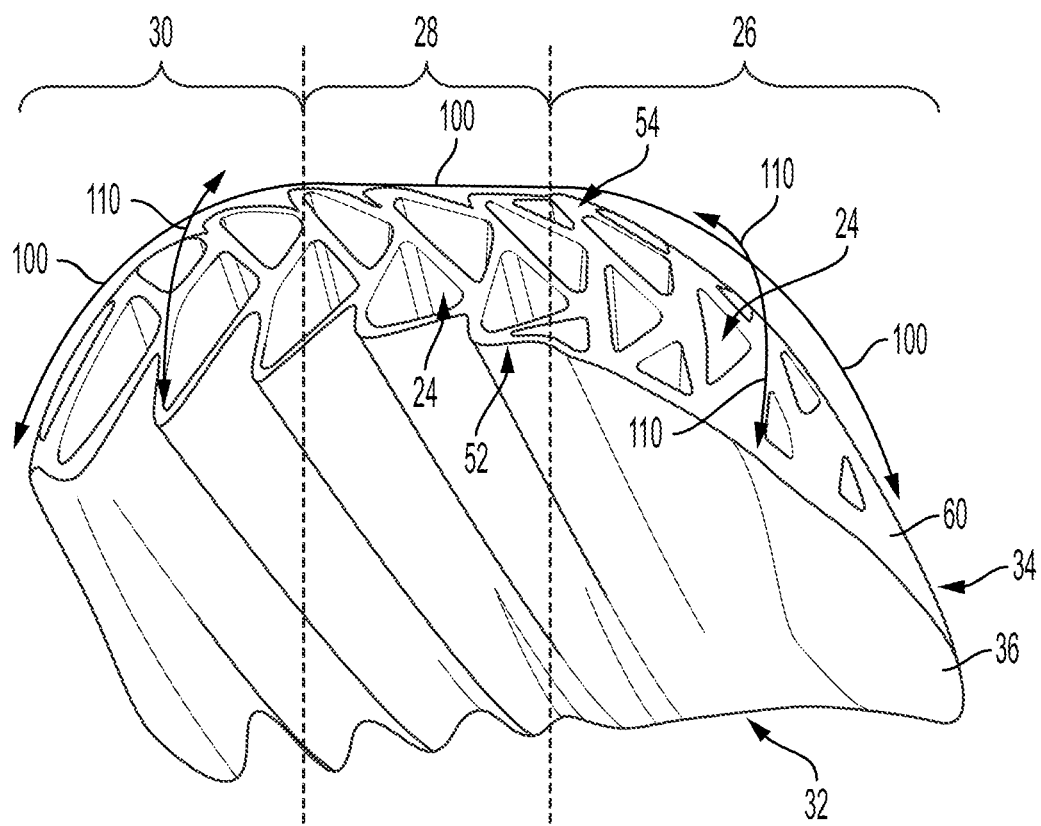
FIG. 4 shows a perspective view of a sole for an article of footwear according to some embodiments.

As shown in FIG. 4, midsole 18 may comprise three regions: a forefoot region 26, a midfoot region 28, and a rearfoot region 30. In some embodiments, a plurality of apertures 24 are disposed within each region of the midsole 18. In some embodiments, apertures 24 are disposed throughout midsole 18. For example, apertures 24 may be disposed from a perimeter wall 50 at the medial edge 52 of the midsole 18 to perimeter wall 50 at the lateral edge 54 of midsole 18. Similarly, apertures 24 may be disposed from a perimeter wall 50 at the heel of the midsole 18 to perimeter wall 50 at the toe of midsole 18. In some embodiments, apertures 24 are only disposed in some regions of midsole 18 (e.g., only in a forefoot region 26 or only in forefoot region 26 and midfoot region 28).

Figure 15:
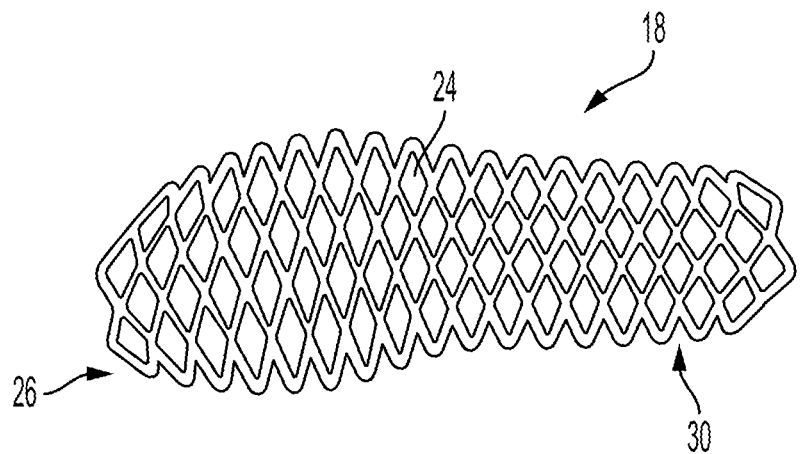
FIG. 15 shows a bottom view of a sole for an article of footwear according to some embodiments.
Figure 16:
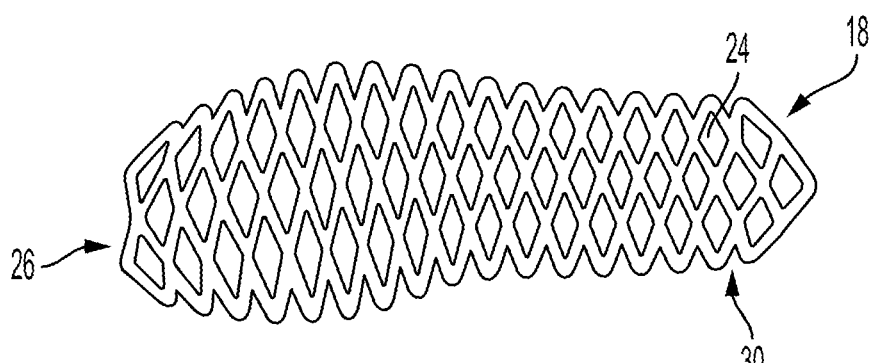
FIG. 16 shows a bottom view of a sole for an article of footwear according to some embodiments.
Figure 17:
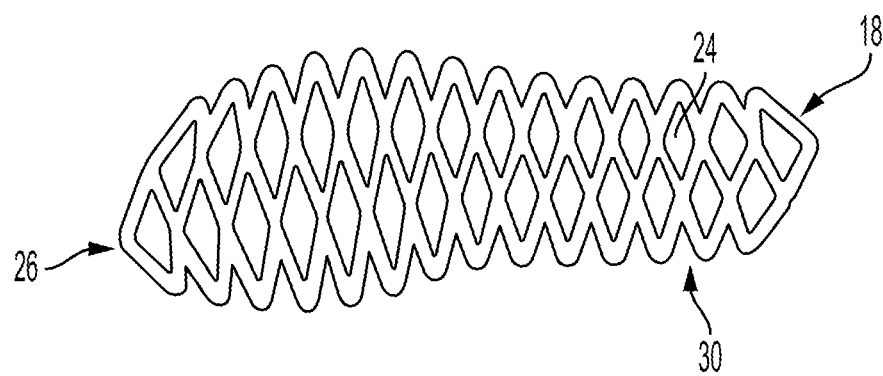
FIG. 17 shows a bottom view of a sole for an article of footwear according to some embodiments.

A variety of aperture arrangements may be used. In some embodiments, as shown, for example, in FIG. 3, apertures 24 may extend from the rearfoot region 30 to the forefoot region 26 in generally two columns, c1 and c2, wherein apertures 24 within columns c1 and c2 are offset from one another in a transverse direction and a longitudinal direction such that apertures from c1 are not collinear with apertures from c2. Thus, the apertures 24 may be disposed in an alternating pattern such that a center of one of the apertures 24 is not aligned in a transverse direction or a longitudinal direction with a center of an adjacent aperture 24. In some embodiments, the forefoot region 26 may have additional columns of apertures 24, to accommodate for a greater width of the forefoot region 26. For example, in some embodiments, as shown in FIGS. 15-17, the apertures 24 may be arranged in two, three, or four columns. In some embodiments, the aperture size is unaffected by the number of columns. In some embodiments, the aperture size is dependent on the number of columns. For example, a greater number of columns may result in a smaller overall aperture size throughout. This can be shown through a comparison of the aperture sizes in FIG. 15 compared to the larger aperture size of apertures 24 in FIG. 17, where there are fewer columns. In some embodiments, one aperture 24 may extend the full width of the article of footwear 10. In some embodiments, apertures may be arranged in a grid where multiple apertures 24 are collinear across the width of the midsole 18.

The size and shape of the apertures 24 may help control the stiffness of the midsole for that region. In some embodiments, the apertures 24 may be shaped with three or four sides such as triangular, square, or diamond shaped, as shown in FIGS. 13 and 15-17. In some embodiments, the apertures 24 may be shaped such that the apertures have more than four sides, e.g. pentagons, hexagons, octagons, or some other shape.

The size and shape of the apertures 24 may vary depending on which region they are disposed within. For example, as shown in FIG. 3, in the forefoot region 26, three to four apertures 24 may fit side by side, whereas in the midfoot region 28 and rearfoot region 30, only one to two apertures 24 may fit side by side. In some embodiments, aperture size ranges between an area of 32 mm$^2$ to an area of 1200 mm$^2$. Other aperture sizes may also be used. In some embodiments, the smallest apertures 24 have an area of 32 mm$^2$. For example, the smallest aperture 24 may be diamond shaped with a width of 10 mm, a height of 4 mm, and an area of about 32 mm$^{2'}$ In some embodiments, apertures 24 may be roughly 55 mm wide by 25 mm with an area of about 800 mm$^2$. In some embodiments, apertures 24 may be roughly 80 mm wide by 40 mm with an area greater than 1200 mm$^2$.

A smaller aperture size may provide greater stiffness due to the increased resistance to collapsing when under the forces of physical activity. Conversely, a larger aperture size will provide more flexibility due to the lack of resistance to collapsing when under the forces of physical activity. In some embodiments, the size of the apertures 24 in the rearfoot region 30 and midfoot region 28 are greater than the size of the apertures 24 in the forefoot region 26. In some embodiments, the average size of the apertures 24 disposed in a forefoot region 26 of the cored midsole 18 is different than an average size of the apertures 24 disposed in a rearfoot region 30 of the cored midsole 18. In some embodiments, apertures 24 within each region may also be different in size.

Figure 11:
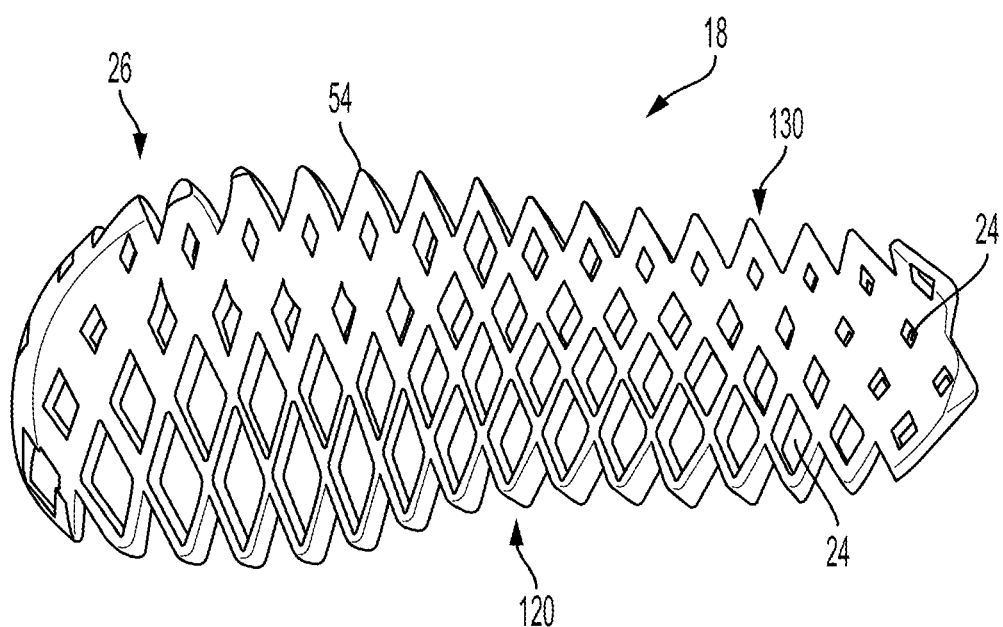
FIG. 11 shows a top view of a sole for an article of footwear according to some embodiments.

In some embodiments, the size of the apertures 24 may vary from a medial side 120 to a lateral side 130 of the cored midsole 18, as shown, for example, in FIG. 11. The aperture size may vary as a gradient from the medial side 120 to the lateral side 130. For example, in some embodiments, the apertures on the medial side 120 may be larger than the apertures 24 on the lateral side 130 and the apertures 24 may decrease in size the closer their position is to the lateral edge 54. This provides more cushion on the medial side 120 and more stiffness and support on the lateral side 130. Smaller apertures 24 on the lateral side 130 enable a banking effect of the midsole 18 to reduce underpronation due to the stiffer lateral functionality. The variation in aperture size may be customizable for a particular wearer.

In some embodiments, the lateral gradient in aperture size only exists in some regions of the sole 18. For example, the size of the apertures 24 in the rearfoot region may be the same on both the medial side 120 and the lateral side 130, whereas the size of the apertures in the forefoot region 26 are larger on the medial side 120 than the lateral side 130. This configuration may provide forefoot banking and horizontal heel displacement (e.g., controlled collapse with forward movement).

In some embodiments, the shape of the apertures 24 may contribute to the stiffness of the article of footwear 10. A variety of shapes may be used. For example, in some embodiments, the shape of apertures 24 may be circular, oval, square, diamond, arcuate, or some other polygonal or non-polygonal shape. In some embodiments, the shape of apertures 24 may be triangular. In some embodiments, for example, as shown in FIG. 3, the orientation of the triangular apertures 24 are such that the vertex point 25 (i.e. the point of the triangle) is closest to the toe 90 of the article of footwear 10. This configuration aids in the collapsing of the cored midsole during physical activity.

Figure 6:
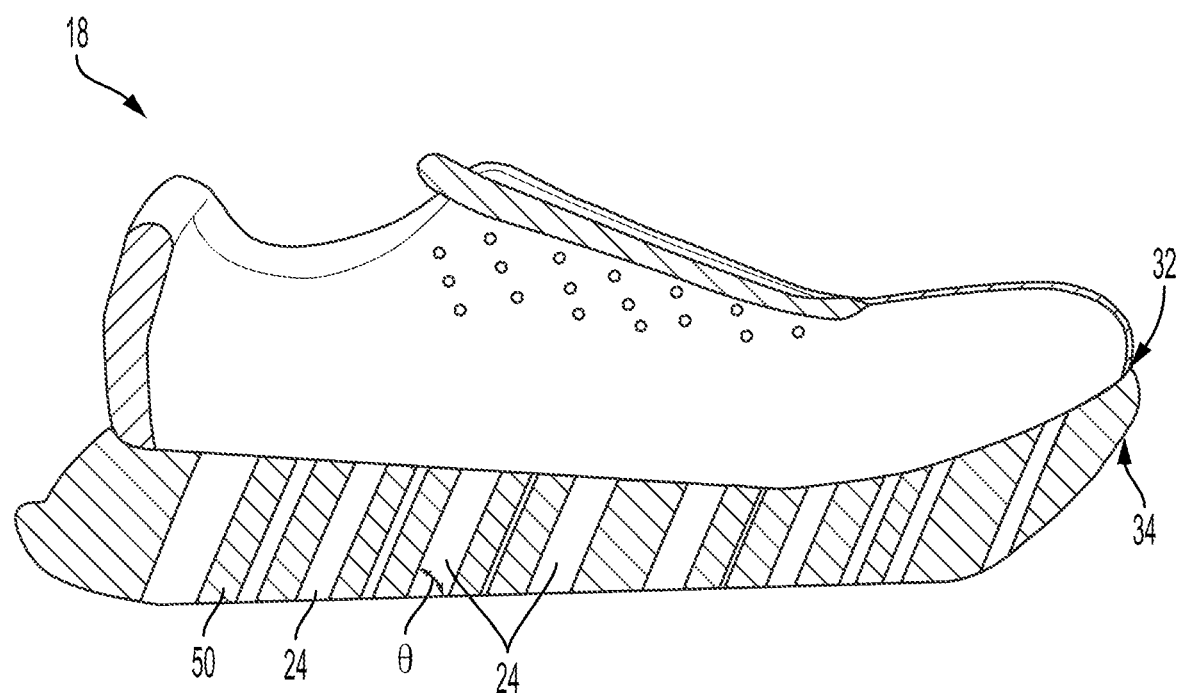
FIG. 6 shows a cross-sectional view of FIG. 3 along line 6-6, showing a sole for an article of footwear according to some embodiments.

In some embodiments, all of the apertures 24 have the same shape. In some embodiments, the apertures 24 may have different shapes in different regions 26, 28, 30. In some embodiments, the shape of the aperture 24 remains the same throughout the height of the midsole 18 (as shown in FIG. 6). In some embodiments, apertures 24 have a uniform shape along its height. In some embodiments, the shape of the aperture 24 varies along the height of the midsole 18. In some embodiments, for example, as shown in FIG. 3, the apertures 24 have a shape with a greater length in the transverse direction than the length in the longitudinal direction (i.e. the base of the triangle is greater than the height). Depending on the desired stiffness, a particular aperture size and shape can be selected. These changes in aperture size and shape alter the configuration of the apertures and hence alter the desired stiffness.

In some embodiments, apertures of a cored midsole (e.g., apertures 24 of midsole 18) are hollow portions of the midsole. For example, the apertures may be hollow columns that extend from the bottom surface to the top surface of the midsole structure. In some embodiments, the apertures are passageways through the midsole (e.g., from a bottom surface to a top surface). The apertures may also be openings or cavities in or through the midsole structure. As discussed above, the apertures may be defined by a plurality of walls (e.g., walls 50). In some embodiments, the walls form a tubular element surrounding the apertures. Thus, the cored midsole may comprise tubular elements forming multiple apertures. In some embodiments, the walls form partitions between adjacent apertures. In some embodiments, the walls form a boundary element that surrounds the aperture to form the sides of the apertures.

In addition to contributing to the stiffness of the midsole 18, the apertures 24 reduce the overall weight of the article of footwear 10. This construction leads to a lightweight, yet resilient midsole 18 that promotes optimal toe-off experience during physical activity.

Figure 5:
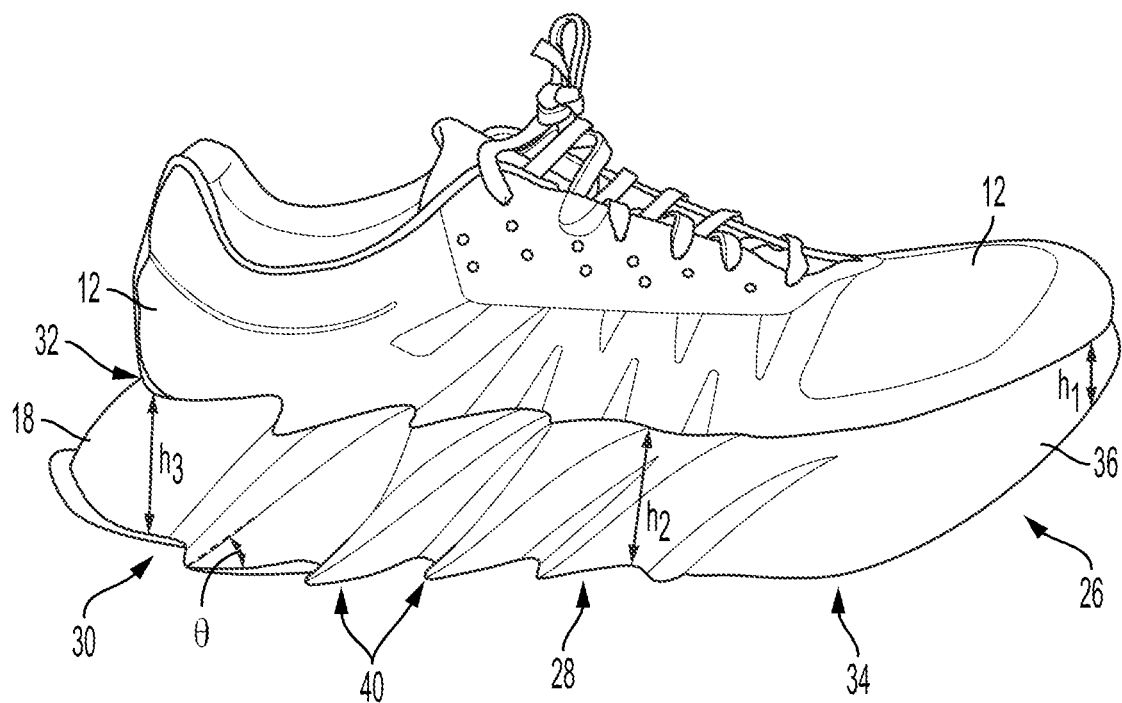
FIG. 5 shows a side view of an article of footwear according to some embodiments.

To further facilitate an optimal toe-off experience, midsole 18 may also include a rocker shape, such that the article of footwear 10 promotes a softer touch down and smoother ride experience for a user during physical activity. The rocker shape, as shown in FIG. 4, may promote rocking in the longitudinal direction 100. In some embodiments, the rocker shape may also promote rocking in the transverse direction 110. In some embodiments, the rocking in the longitudinal direction 100 results from the forefoot region 26 and rearfoot region 30 having a curved shape, and the midfoot region having a flat shape. In some embodiments, the forefoot region 26 and rearfoot region 30 have a convex shape. In some embodiments, the rocking in the transverse direction 110 results from the forefoot region 26 and rearfoot region 28 having a curved shape. In some embodiments, the forefoot region 26 and rearfoot region 28 have a convex shape. In some embodiments, the height of the midsole 18 varies at different regions of the foot. For example, as shown in FIG. 5, midsole 18 is taller in the midfoot region 28 than in the forefoot region 26 and the rearfoot region 30 (e.g., h2 in midfoot region 28 is greater than h1 in forefoot region 26 and h3 in rearfoot region 30). In some embodiments, the height of midsole 18 continues to decrease in the forefoot region 26 closer to a front of the midsole 18. In some embodiments, the height of midsole 18 continues to decrease in the rearfoot region 26 closer to a back of the midsole 18. This configuration contributes to a rocking function that promotes a quicker transition to the forefoot and thereby enhances the propulsive phase of a wearer's movement. The rocker shape naturally promotes displacement from an unstable apex of the curve to a more neutral (at rest) position, thus helping a wearer to get to the toe-off phase.

In some embodiments, for example, as shown in FIG. 5, perimeter surface 36 may comprise protrusions 40, extending outwardly from the perimeter surface 36. In some embodiments, the shape of the protrusions 40 may vary. In some embodiments, protrusions 40 may be rounded, angular, pointed, arcuate, or a combination thereof. In some embodiments, for example in FIG. 5, protrusions 40 have a pointed shape. Protrusions 40 increase the overall surface area of the midsole and help create a wider support base for the article of footwear 10 such that the footwear is more stable. Protrusions may extend 10 mm to 20 mm in a transverse direction away from the rest of perimeter surface 36. In some embodiments, protrusions 40 may extend diagonally from the top surface 32 of the cored midsole 18 to the bottom surface 34 of the cored midsole 18. In some embodiments, perimeter surface 36 may include the same amount of protrusions 40 on both the medial and lateral side of the midsole 18. In some embodiments, the article of footwear 10, may have a different amount of protrusions 40 on the medial side than the number of protrusions 40 on the lateral side. In some embodiments, the article of footwear 10 may include five protrusions 40 on the medial side and six protrusions 40 on the lateral side. The protrusions 40 may be disposed on any or all regions of the midsole 18. For example, in some embodiments, the protrusions 40 may be disposed in the midfoot region 28 and rearfoot region 30.

In some embodiments, the protrusions 40 extend diagonally along the height of the midsole 18. As shown in FIG. 5, the angle θ denotes the angle at which the protrusions 40 extend throughout the height of the midsole 18. Angle θ is measured relative to the bottom surface 34 of the midsole 18. Angle θ may range from about 55-70 degrees. As discussed above, in some embodiments, the midsole 18 may be cored at an angle relative to the bottom surface 34 of the midsole 18 (i.e., diagonal apertures 24). In some embodiments, the angle of the protrusions 40 and angle of the cored midsole 18 (apertures 24) are the same. In some embodiments, the angle of the protrusions 40 and angle of the cored midsole 18 (apertures 24) are different. This range of angles and diagonal geometry allows the midsole 18 to collapse during impact, providing a user increased cushioning and comfort. The diagonal positioning of the protrusions 40, midsole 18, and triangular shape of apertures 24 provide an optimal toe-off experience during physical activity.

The protrusions 40 provide an articulated structure on the sidewall (i.e., perimeter surface 36) that may increase the collapsing effect of the apertures 24 and allow for shear movement during the collapsing of the midsole 18. In some embodiments, the articulated structure closely follows the shape (e.g., the angle) of the apertures 24. In some embodiments, the articulated structure (e.g., protrusions 40) follow the shape of the apertures 24 and thus provides a consistent thickness for wall 50 at perimeter surface 36. In some embodiments, as shown for example in FIG. 12, protrusions 40 are only located in the rearfoot region 30 and midfoot region 28. This allows the rearfoot region 30 and midfoot region 28 to shear and provide the collapsing movement when these portions of the article of footwear contact the ground. In contrast, where the forefoot region 26 lacks protrusions 40, the forefoot region 26 provides a smoother sidewall (i.e., perimeter surface 36). This smoother sidewall is stiffer than the articulated sidewall and reduces the articulation of apertures 24, which may allow for a more stiff toe-off as the forefoot region 26 contacts the ground. In some embodiments, the protrusions 40 may extend from rearfoot 30 to forefoot 26. This configuration would allow the article of footwear 10 to shear during movement and provides the greatest level of comfort during movement.

Figure 12:
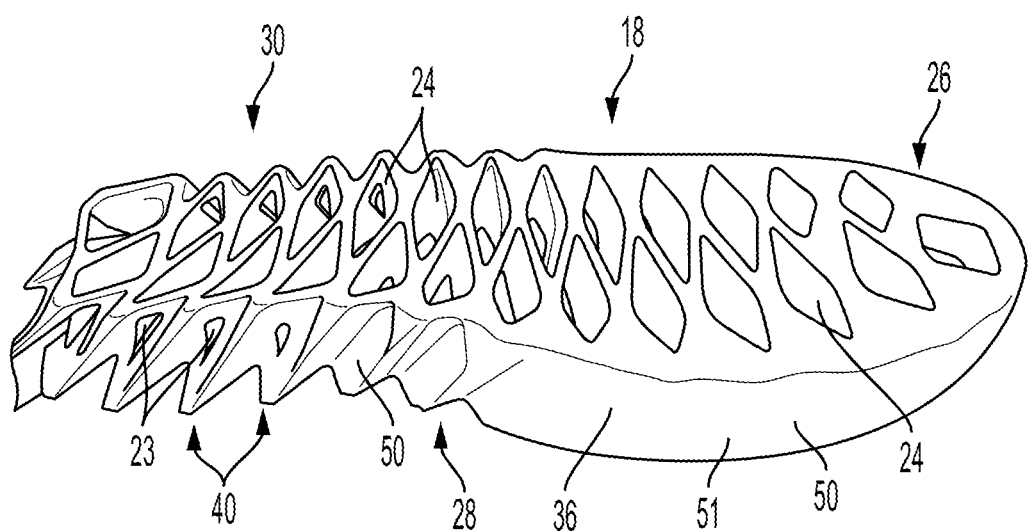
FIG. 12 shows a perspective view of a sole for an article of footwear according to some embodiments.

In some embodiments, as shown for example in FIG. 12, the protrusions 40 include horizontal apertures 23 that extend laterally towards the center of the midsole 18. In some embodiments, the horizontal apertures 23 are disposed within the rearfoot region 30. In some embodiments, horizontal apertures 23 are disposed within the rearfoot region 30, midfoot region 28, and forefoot region 26. In some embodiments, apertures 23 are disposed on any wall 50 that forms the perimeter surface 36. These lateral apertures 23 allow for a unique visual effect. Further, the orientation of the horizontal apertures 23, extending laterally through the midsole, may allow for additional cushioning in the respective regions where the horizontal apertures 23 are located. For example, there may be additional cushioning because including horizontal apertures 23 increases the ratio of cored portions compared to filled portions. In some embodiments, the horizontal apertures 23 help to vent the midsole.

Figure 7:
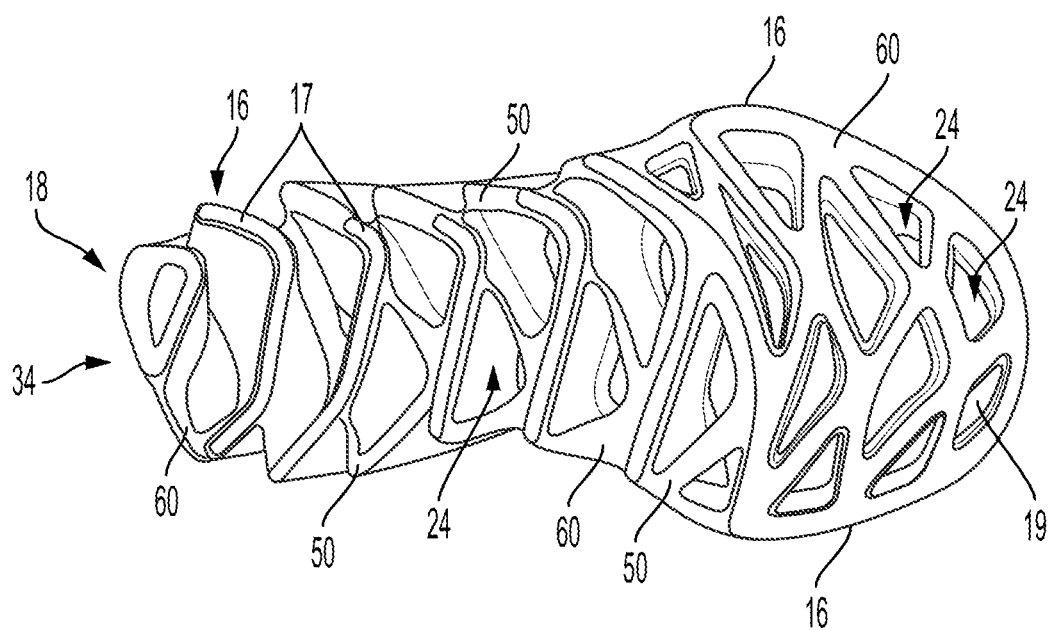
FIG. 7 shows a bottom view of a sole for an article of footwear according to some embodiments.

In some embodiments, sole 14 may include an outsole 16. As shown for example in FIG. 7, outsole 16 is disposed on the bottom surface 34 of midsole 18. In some embodiments, outsole 16 extends across the entire bottom surface of midsole 18. In some embodiments, outsole 16 extends across the bottom surface of midsole 18 such that every wall 50 is covered by outsole 16. In some embodiments, outsole 16 may cover only portions of walls 50. For example, as shown in FIG. 7, outsole 16 may cover all of the walls 50 disposed in the forefoot region 26, but only portions of the walls 50 in other regions of the midsole 18. Thus, outsole 16 may be disposed in some or all regions of the midsole 18.

In some embodiments, outsole 16 is composed of one piece (as shown in FIG. 3). In some embodiments, outsole 16 is composed of multiple pieces, such as strips 17. As shown in FIG. 7, outsole 16 may include a plurality of strips 17 that cover only portions of walls 50. The strips 17 do not obstruct the apertures 24 disposed within the midsole 18. Thus, outsole 16 does not cover apertures 24. Instead, strips 17 are coupled to the bottom surface 34 of the walls 50 of the midsole 18.

In some embodiments, outsole 16 may be selectively disposed such that it covers only the portions of the midsole 18 that would undergo the most forces during physical activity, such as the forefoot region 26 and the rearfoot region 30. Within each region, outsole 16 may be even further selectively disposed such that it covers the most commonly worn areas within each region for a specific type of runner. For runners who overpronate during running, the outsole 16 may be disposed on the medial side of the regions. For runners who underpronate during running, outsole 16 may be disposed on the lateral area within each region. And, for runners who have a neutral running gait, outsole 16 may be disposed within the center of the regions. In some embodiments, sole 14 does not include an outsole 16.

Sole 14 may also include one or more reinforcing members 19. Reinforcing members 19 may be in various forms, such as a plate, a rod, or a fabric. Reinforcing members 19 may be located in various locations (e.g., above the midsole, within the midsole, below the midsole). In some embodiments, reinforcing member 19 may be disposed in any or all regions (e.g., forefoot, midfoot, rearfoot) of the midsole. The reinforcing members 19 provide additional stiffness to the article of footwear 10. Example configurations of reinforcing members 19 are provided below.

Figure 8:
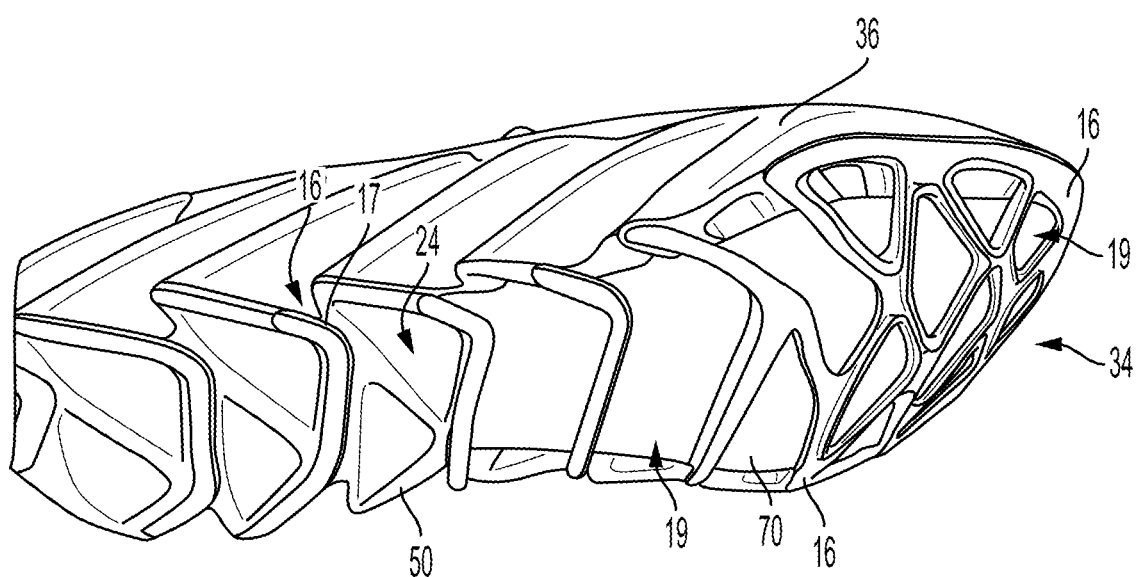
FIG. 8 shows a perspective view of a sole for an article of footwear according to some embodiments.

In some embodiments, as shown, for example, in FIG. 8, reinforcing member 19 may be disposed within the forefoot region 26 and extend into the midfoot region 28. In some embodiments, reinforcing member 19 is disposed within the center of the regions and does not extend to the perimeter 36. In some embodiments, reinforcing member 19 at least partially covers some apertures 24. In some embodiments, reinforcing member 19 is a carbon plate 70.

Figure 9:
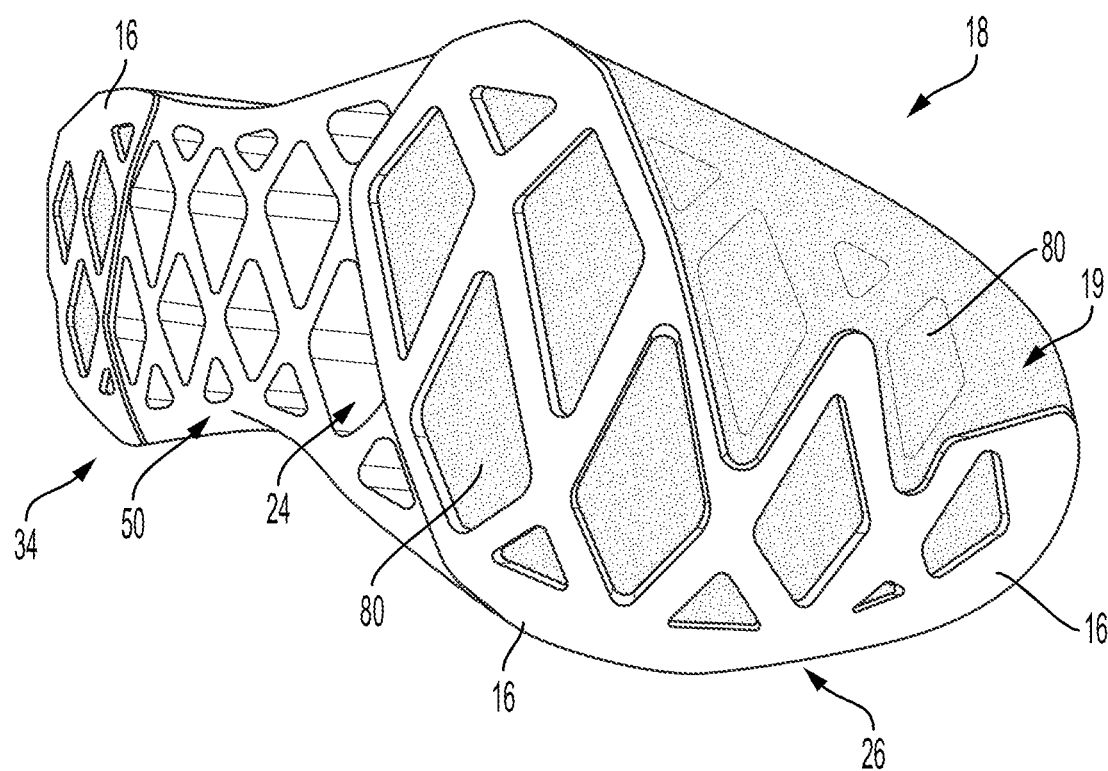
FIG. 9 shows a perspective view of a sole for an article of footwear according to some embodiments.

In some embodiments, for example as shown in FIG. 9, reinforcing member 19 may be disposed in some or all regions of the midsole 18. In some embodiments, reinforcing member 19 may be disposed in the forefoot region 26. In some embodiments, reinforcing member 19 may extend to the perimeter surface 36 and cover apertures 24. In some embodiments, reinforcing member 19 is a non-stretch fabric 80. Non-stretch fabric 80 may be a mesh fabric. The amount of additional stiffness provided to the reinforcing member depends on the type of reinforcing member 19 and the thickness of the reinforcing member 19. A carbon plate reinforcing member 70 may promote a more stiffened forefoot, whereas a non-stretch fabric reinforcing member 80 may regulate bending stiffness.

In some embodiments, sole 14 may comprise a reinforcing member 19 disposed on the top surface 32 of the midsole 18. In some embodiments, the reinforcing member 19 may be disposed in any or all of the regions of the midsole 18. For example, in FIG. 7, in the forefoot region the reinforcing member 19 can be viewed through the apertures 24. In some embodiments, the reinforcing member 19 extends through the forefoot, midfoot, and rearfoot region of the midsole 18. The reinforcing member 19 provides additional stiffness to the midsole 18, and its configuration on the top surface 32 of the midsole 18 helps reduce any interference with the collapsing of the apertures 24 during physical activity. Reinforcing member 19 may be a rigid plastic plate or a non-stretch fabric.

Figure 18:
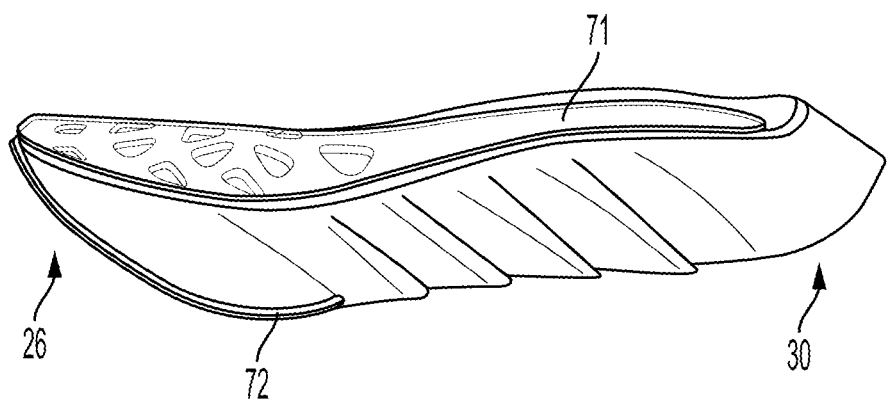
FIG. 18 shows a side view of a sole for an article of footwear according to some embodiments.

In some embodiments, as shown in FIG. 18, sole 14 may include more than one reinforcing member 19 formed as plates. For example, sole 14 may include a plate 72 disposed between the midsole 18 and the outsole 16 and a plate 71 disposed between the midsole 18 and the upper 12. In some embodiments, only portions of plate 71 and 72 overlap. For example, plate 71 extends from forefoot region 26 to rearfoot region 30, and plate 72 is disposed only in a forefoot region 26. This location of plate 72 may help provide a stiffer toe-off. Plates 71 and 72 may be made of carbon (or be carbon-infused), nylon, nylon with carbon, thermoplastic polyurethane (TPU), or some other material.

Figure 13:
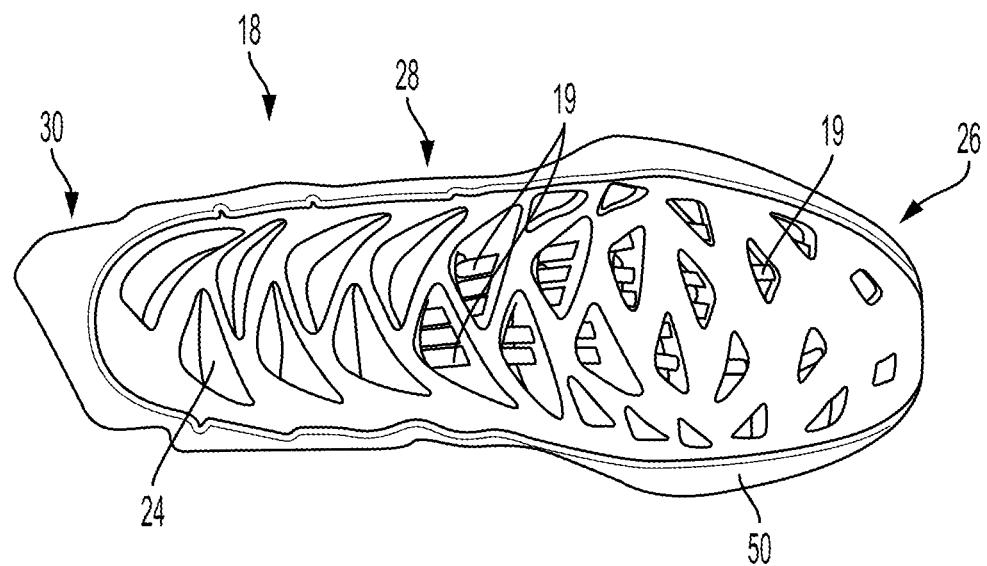
FIG. 13 shows a top view of a sole for an article of footwear according to some embodiments.
Figure 19:
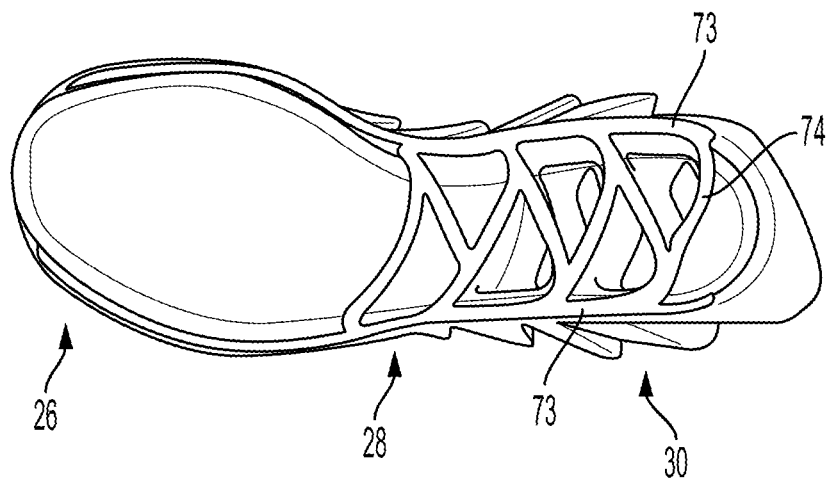
FIG. 19 shows a top view of a sole for an article of footwear according to some embodiments.
Figure 20:
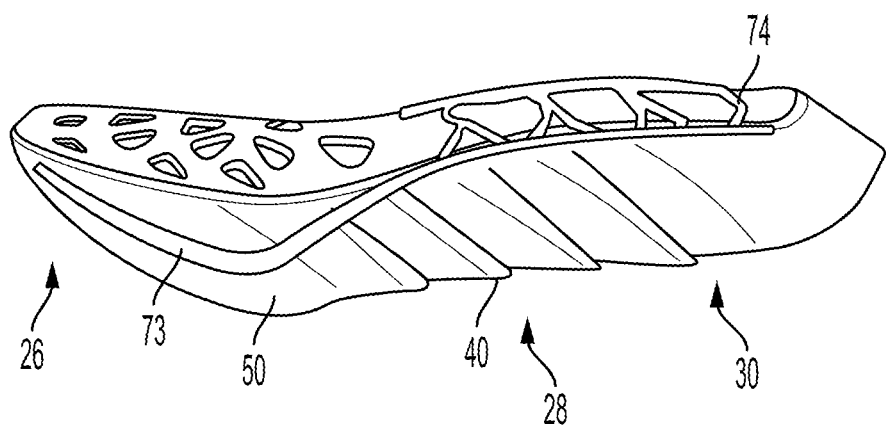
FIG. 20 shows a side view of a sole for an article of footwear according to some embodiments.

In some embodiments, the shoe may have a plurality of rod-shaped reinforcing members 19 (see FIGS. 13, 19, and 20). In some embodiments, rod-shaped reinforcing members 19 may be carbon, carbon infused, nylon, nylon with carbon, or TPU.

In some embodiments, for example, as shown in FIG. 13, the rod-shaped reinforcing members 19 are embedded within midsole 18. Embedded rod-shaped reinforcing member 19 may extend from rearfoot region 30 to forefoot region 26, or from midfoot region 28 to forefoot region 26. For example, in FIG. 13, five reinforcing members 19 extend from the midfoot region 28 to the forefoot region 26. More or fewer rod-shaped reinforcing members 19 may be used. In some embodiments, the reinforcing members 19 are equally spaced apart from each other. In some embodiments, the reinforcing members 19 may be closer together in the midfoot region 28 and spread farther apart from each other as they extend in the forefoot region 26. In some embodiments, as shown in FIG. 13, rod-shaped reinforcing members 19 extend across apertures 24 so that they are visible through apertures 24. In some embodiments, rod-shaped reinforcing members 19 may be visible through horizontal apertures 23

In some embodiments, as shown in FIGS. 19 and 20, rod-shaped reinforcing members 73 and 74 are aligned with (e.g., on top of or embedded within) walls 50 and do not obstruct or protrude through apertures 24 or horizontal apertures 23. Rod-shaped reinforcing members 73 may extend longitudinally along wall 50 that forms perimeter 36. In some embodiments, rod-shaped reinforcing members 73 are partially disposed within midsole 18 (e.g., in the forefoot region 26), and partially disposed above midsole 18 (e.g., in the midfoot region 28 and/or rearfoot region 30), as shown in FIG. 20. This configuration leads to the midsole 18 being split in the forefoot region 26 such that half of the forefoot region 26 of the midsole 18 is disposed below rod-shaped reinforcing members 73 and the other half of the forefoot region 26 of the midsole 18 is disposed above the rod-shaped reinforcing members 73. In some embodiments, the rod-shaped reinforcing member 73 disposed within midsole 18 may be exposed on the perimeter walls 50, thus forming part of the sidewall.

Rod-shaped reinforcing members 74 may extend in a transverse direction along walls 50 between apertures. For example, rod-shaped reinforcing members 74 may extend across the width of the shoe, from the lateral edge 54 to the medial edge 52. Rod-shaped reinforcing members 74 may be disposed above midsole 18 and/or embedded within walls 50 of midsole 18.

In some embodiments, rod-shaped reinforcing members 73 and 74 may be cylindrical, triangular, or square. In some embodiments, rod-shaped reinforcing members 73 and 74 may have a width ranging from about 2 mm to 8 mm and a height ranging from about 2 mm to 9 mm. In some embodiments, the height and/or width may vary along the length of the rod. In some embodiments, the width or height of the rod-shaped reinforcing member decreases as it extends from the forefoot region 26 to the rearfoot region 30. For example, rod-shaped reinforcing member 73 and 74 may have a height of 9 mm in the forefoot region 26 and decreasing down to 2 mm as the rod-shaped reinforcing member extends to the rearfoot region 30. In some embodiments, the width and height of the rod-shaped reinforcing member is uniform throughout its length. For example, the rod-shaped reinforcing members 73 and/or 74 may have a width of 4 mm.

Figure 10:
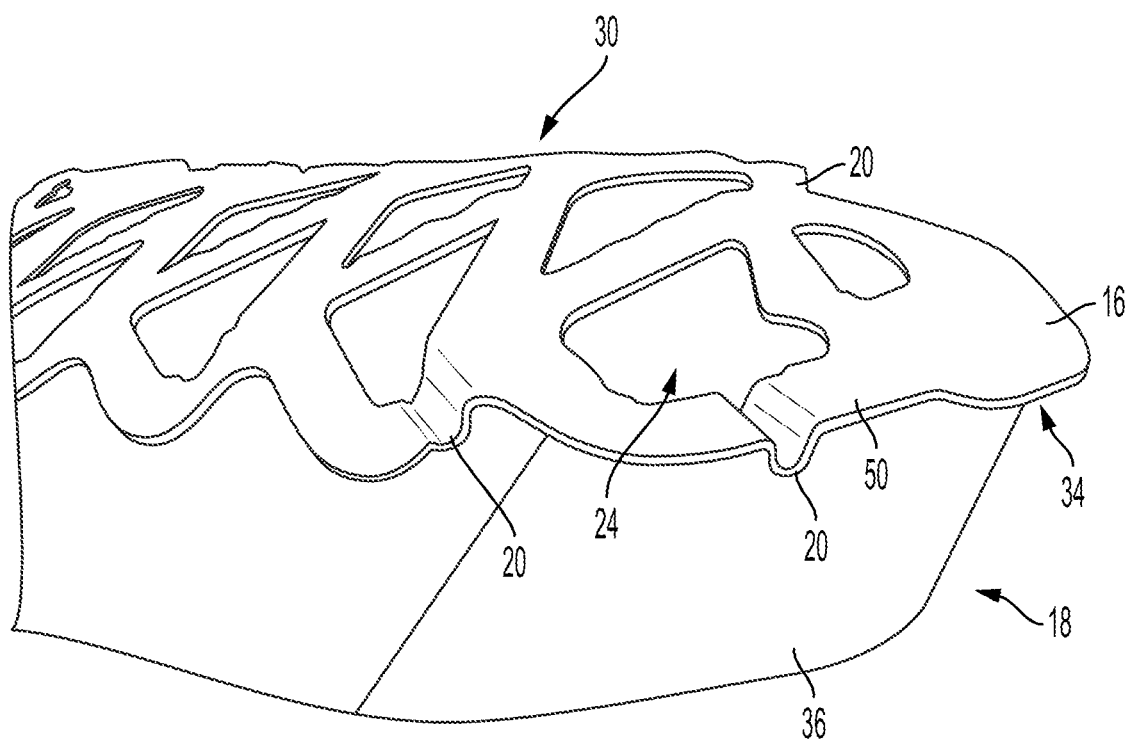
FIG. 10 shows a perspective view of a sole for an article of footwear according to some embodiments.

In some embodiments, as shown in FIG. 10, one or more grooves 20 may be disposed on the bottom surface 34 of midsole 18 and/or outsole 16. In some embodiments, grooves 20 are disposed in the perimeter wall 50 at a bottom surface of the midsole, wherein the groove extends from a perimeter surface of the cored midsole to one of the apertures. Grooves 20 are indentations in the midsole (and/or the outsole) that allow air to escape upon impact with a flat surface. The indentations of grooves 20 form a basin or notch that is not co-planar with the bottom surface 34 of the midsole 18. Without such grooves, the article of footwear 10 may cause a squeaking or impact noise during physical activity. For example, without the grooves, when the article of footwear 10 contacts the ground during physical activity, all of the bottom surface of the midsole 18 may contact the ground, and the midsole 18 will begin to collapse. As the midsole 18 collapses, the air trapped within the collapsing apertures 24 will be forced out of the midsole 18 but become trapped between the bottom surface 34 of the midsole 18 and the surface of the ground. This trapping and forcing of the air to escape out of the article of footwear 10 causes a squeaking or impact noise during physical activity.

To reduce impact noise and squeaking, grooves 20 are recessed into the walls 50 of the midsole 18 and the recess extends into the apertures 24 or the perimeter surface 36. In some embodiments, grooves 20 do not contact the ground and form a gap between the ground surface and the bottom of the midsole 18, which allows the air from within the apertures 24 to escape through the grooves 20. Grooves 20 may extend from the perimeter surface 36 of the cored midsole 18 to one of the apertures 24. This configuration reduces the squeaking or impact noise that typically occurs during physical activity since the air is no longer trapped and has a path to escape. In some embodiments, grooves 20 may contact the ground. For example, grooves may contact the ground when the midsole 18 collapses while the wearer is running. Thus, in some instances, grooves 20 may allow air to escape during initial contact of the shoe and the ground and while the midsole 18 is collapsing but then grooves 20, or a portion of grooves 20, may contact the ground if midsole 18 collapses beyond a certain point.

In some embodiments, for example, as shown in FIG. 10, grooves 20 may be located in the rearfoot region 30 of the midsole 18. Other configurations are also possible. For example, grooves 20 may be located in the forefoot region 26 or the midfoot region 28. In some embodiments, every aperture 24 that is adjacent to the perimeter surface 36 has a groove that connects the aperture 24 to the perimeter surface 36. Grooves 20 may range from 5 mm to 10 mm wide and from about 2 mm to 5 mm deep.

Figure 14:
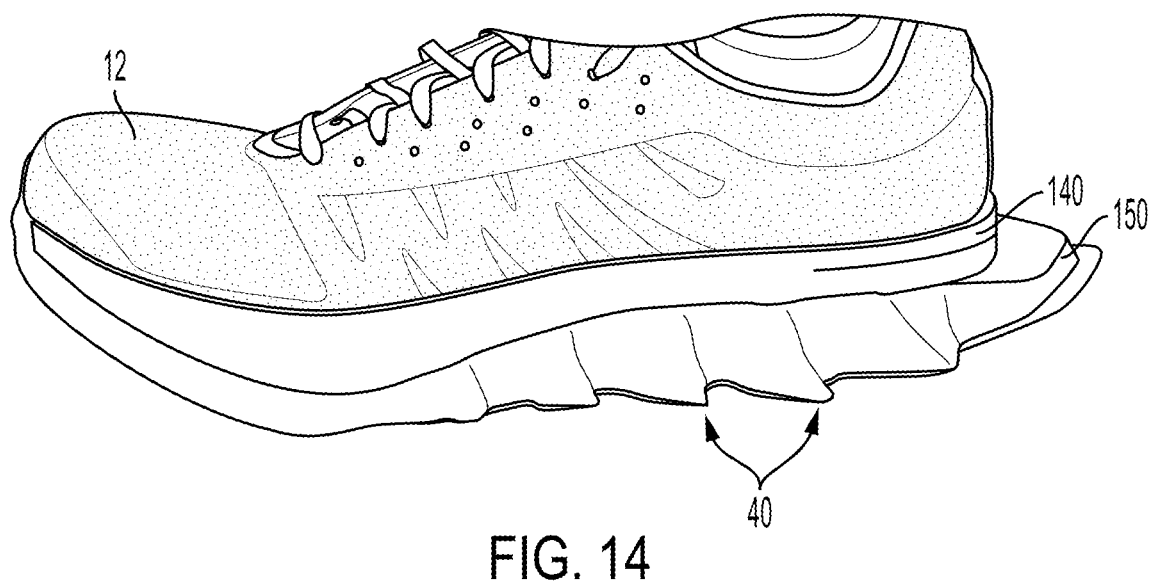
FIG. 14 shows a side view of an article of footwear according to some embodiments.

In some embodiments, as shown in FIG. 14, the midsole is a layered structure. For example, in some embodiments, the midsole is composed of a top non-cored solid portion 140 and a bottom cored midsole 150 with apertures 24 and articulated sidewalls or protrusions 40 as described above. The ratio of the non-cored solid portion 140 to the cored portion 150 may differ in various embodiments. In some embodiments, the ratio of the non-cored solid portion 140 to the cored portion 150 is between 80:20 and 20:80. For example, in some embodiments the ratio of the non-cored solid portion 140 to the cored portion 150 is 50:50. In some embodiments, the non-cored solid portion 140 and the cored portion 150 are made of the same material. In some embodiments, each layer of the layered midsole is made of a different material.

Various embodiments described herein provide an article of footwear with a lightweight and highly cored midsole. The configuration of the size and shapes of the apertures stiffen the midsole at the forefoot, midfoot, and rearfoot regions where the apertures are located. The convex shape and curvature of the rearfoot and forefoot region also create a geometry that facilitates rocking (i.e., from back to front). Thus, the article of footwear may promote a quicker transition to the forefoot and thereby enhance the propulsive phase of a wearer's movement. In some embodiments, the midsole may be customized for a particular wearer. For example, a scan may be taken to measure a user's foot size and a midsole can be created that is tailored to the scanned configuration.

Figure 21:
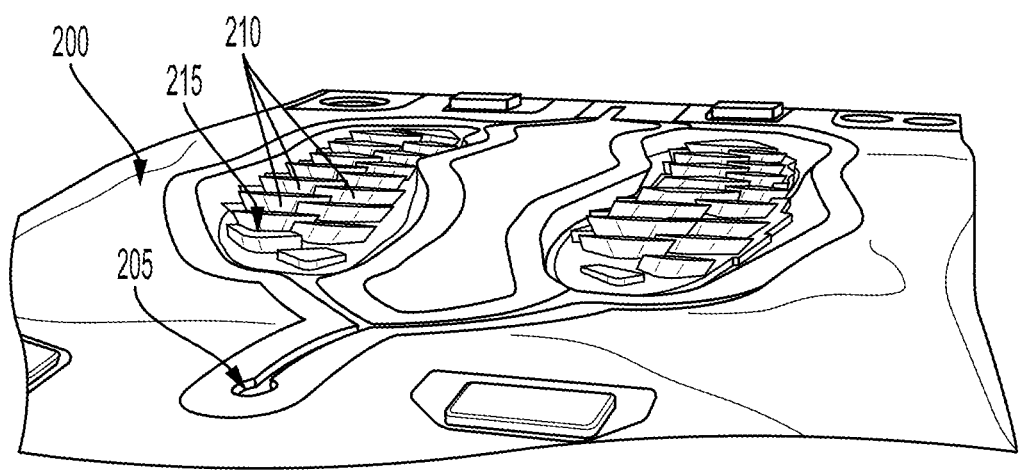
FIG. 21 shows a perspective view of a mold for making a midsole according to some embodiments.

Various manufacturing processes may be used to make midsole 18 as described above. In some embodiments, the midsole may be manufactured through ethylene-vinyl acetate (EVA) injection molding. In EVA injection molding, a smaller scaled mold may be used than other molding techniques. For example, in some embodiments, the EVA injection mold may be about 40% of the size of the finished midsole. An example mold 200 is shown in FIG. 21. In some embodiments, EVA material is inserted into mold 200 through injection path 205. Mold 200 may include one or more injection paths 205. Although smaller than the finished product, mold 200 resembles the shape of the midsole 18. Mold 200 defines a space 215 to receive EVA material and includes a plurality of projections 210 that are arranged to form the apertures 24 in midsole 18. Upon injection, EVA material fills space 215 around projections 210. Once the material is within the mold, heat and pressure are applied to form the material into the shape of the mold 200. After the material is formed to the desired shape, the pressure is released, causing the material to expand.

Figure 22:
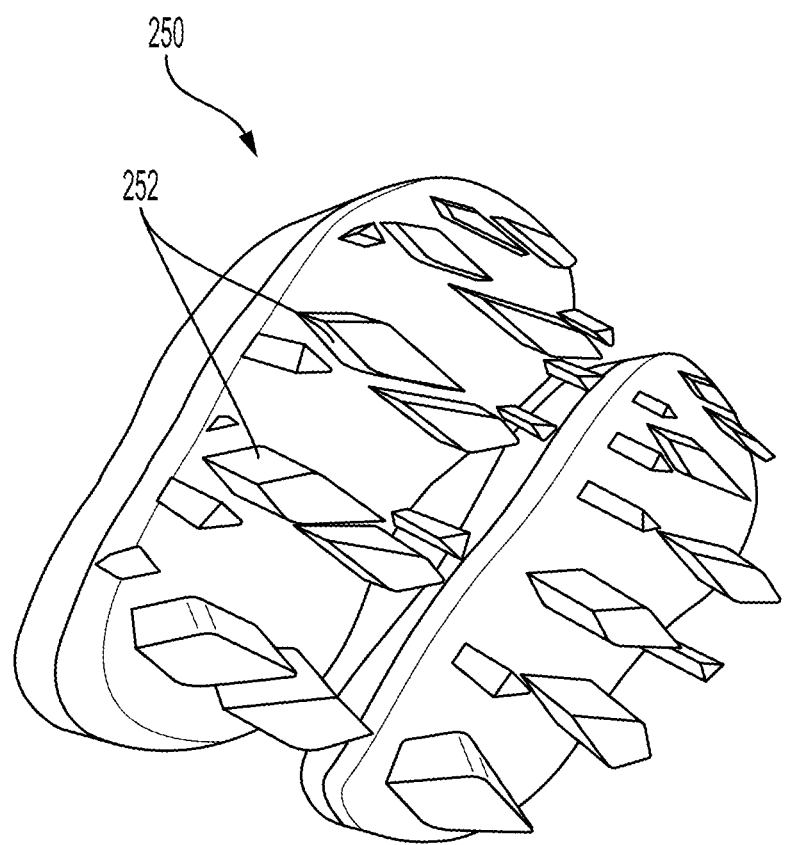
FIG. 22 shows a perspective view of a cooling fixture used in a manufacturing process according to some embodiments.

In some embodiments, to maintain the finished part shape and size, a cooling fixture 250 is utilized. The cooling fixture 250 as shown for example in FIG. 22, includes a plurality of projections 252 which are inserted into apertures 24 of newly formed midsole 18. In some embodiments, cooling fixture 250 includes fewer projections 252 than number of apertures 24 in the midsole 18. In some embodiments, cooling fixture 250 includes the same number of projections 252 as number of apertures 24 in midsole 18. The cooling fixture 250 holds the shape of the injected midsole 18 while the material cools down.

Other manufacturing processes may alternatively be used. In some embodiments, midsole 18 can be manufactured using polyurethane pouring or casting, water jet cutting from oversized midsole shapes, milling, or machining.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A sole for an article of footwear, the sole comprising:
a cored midsole defining a top surface, a bottom surface, and a perimeter surface extending from the top surface to the bottom surface,
wherein the cored midsole defines apertures extending diagonally from the top surface of the cored midsole to the bottom surface of the cored midsole,
wherein a groove is disposed in the bottom surface of the cored midsole,
wherein the groove extends from the perimeter surface of the cored midsole and terminates at one of the apertures,
wherein the groove is configured to allow air trapped within the apertures to escape, and
wherein a width of the groove is between 5 mm and 40 mm.

2. The sole of claim 1, wherein the apertures extend at an angle between 55 degrees and 70 degrees relative to the bottom surface of the cored midsole.

3. The sole of claim 1, further comprising a forefoot region, a midfoot region, and a rearfoot region, wherein the apertures are disposed in the forefoot region, the midfoot region, and the rearfoot region, and wherein an average size of the apertures in the forefoot region is different than an average size of the apertures in the rearfoot region.

4. The sole of claim 1, wherein a height of the cored midsole increases from a forefoot region to a midfoot region and decreases from the midfoot region to a rearfoot region.

5. The sole of claim 1, further comprising a non-stretch fabric disposed at the bottom surface of the cored midsole.

6. The sole of claim 1, wherein the perimeter surface comprises protrusions extending diagonally from the top surface of the cored midsole to the bottom surface of the cored midsole.

7. The sole of claim 6, wherein the protrusions are disposed in a rearfoot region and a midfoot region of the sole, and wherein there are no protrusions in a forefoot region of the sole.

8. The sole of claim 6, wherein a first protrusion of the protrusions maintains a consistent wall thickness between the perimeter surface and a first aperture of the apertures.

9. The sole of claim 1, wherein the width of grooves is between 5 mm and 10 mm.

10. An article of footwear comprising:
an upper; and a cored midsole coupled to the upper and comprising a plurality of walls defining diagonal apertures extending from a top surface to a bottom surface of the cored midsole, wherein a surface area of the walls at the bottom surface of the cored midsole is less than a combined area of the apertures at the bottom surface of the cored midsole, and wherein the plurality of walls comprise a perimeter wall that forms a perimeter surface extending from the top surface to the bottom surface, and wherein the perimeter wall comprises protrusions extending diagonally away from the top surface and towards the bottom surface, and wherein a first protrusion of the protrusions forms a portion of a first aperture of the apertures such that an area of the first aperture at the bottom surface is greater than an area of the first aperture at the top surface, and wherein the protrusions are rounded to form a smooth undulating surface of the perimeter surface.

11. The article of footwear of claim 10, wherein the apertures extend diagonally towards a rearfoot region as the apertures extend from the top surface to the bottom surface of the cored midsole.

12. The article of footwear of claim 10, wherein the apertures are disposed in an alternating pattern such that a center of a first aperture of the apertures is not aligned in a transverse direction with a center of a second aperture of the apertures directly adjacent to the first aperture.

13. The article of footwear of claim 10, further comprising an outsole coupled to the bottom surface of the cored midsole.

14. The article of footwear of claim 13, wherein the outsole comprises multiple pieces.

15. The article of footwear of claim 13, wherein the outsole does not cover the apertures.

16. The article of footwear of claim 10, wherein an average size of the apertures disposed in a forefoot region of the cored midsole is different than an average size of the apertures disposed in a rearfoot region of the cored midsole.

17. The article of footwear of claim 10, further comprising a reinforcing member coupled to the bottom surface of the cored midsole and disposed in a forefoot region of the cored midsole.

18. The article of footwear of claim 17, wherein the reinforcing member comprises a non-stretch fabric.

19. The article of footwear of claim 10, wherein the cored midsole comprises a groove disposed in the perimeter wall at the bottom surface of the cored midsole, wherein the groove extends from the perimeter surface of the cored midsole to one of the apertures.

20. The article of footwear of claim 10, wherein the protrusions are disposed in a rearfoot region and a midfoot region of the cored midsole, and wherein there are no protrusions on a lateral side and a medial side of a forefoot region of the cored midsole.

\* \* \* \* \*